Figure 1:
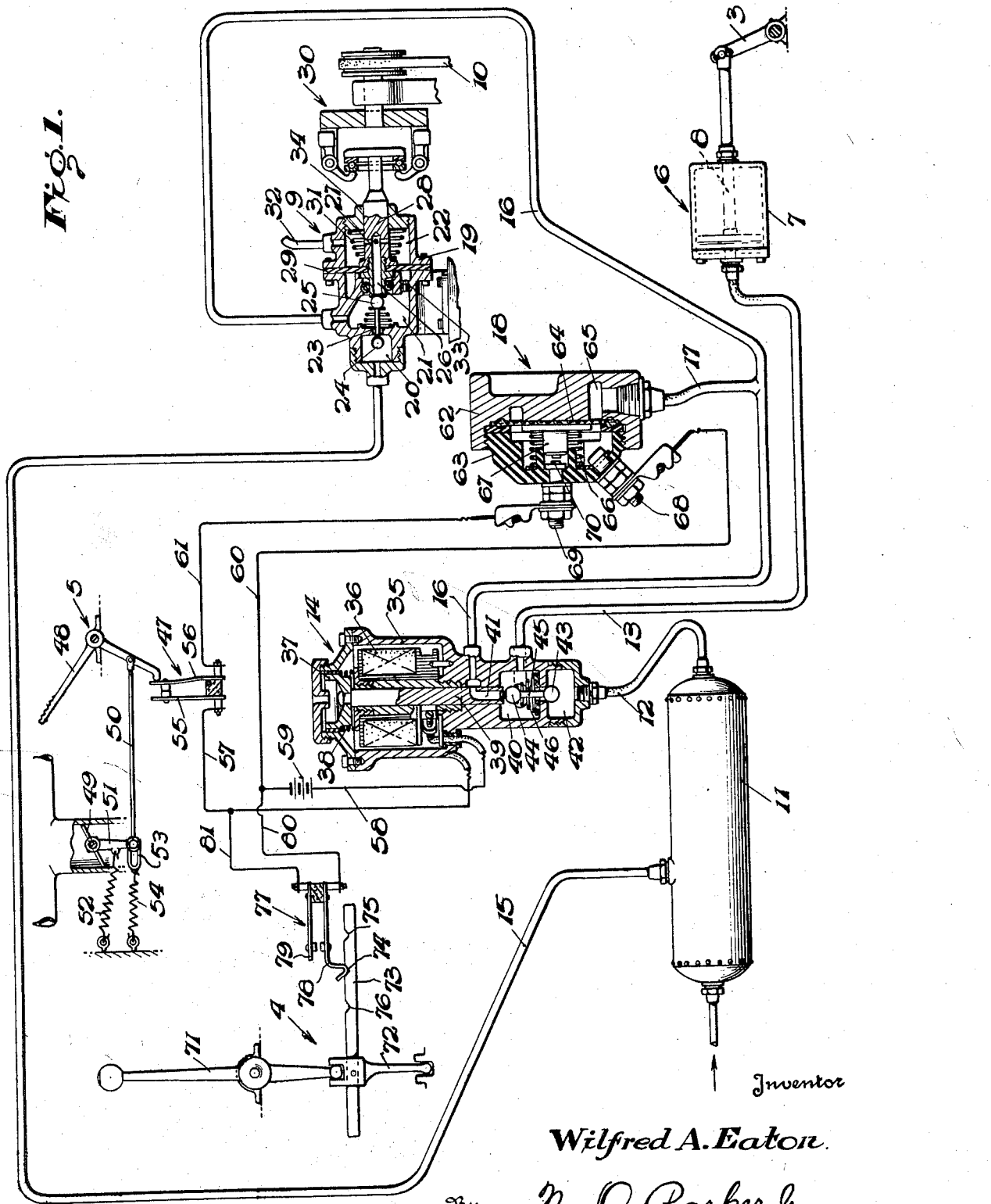

March 14, 1944. W. A. EATON 2,344,399
CLUTCH CONTROL MECHANISM
Filed Oct. 4, 1941 2 Sheets-Sheet 1

Inventor
Wilfred A. Eaton.
By N. D. Parker Jr.
Attorney

March 14, 1944. W. A. EATON 2,344,399
CLUTCH CONTROL MECHANISM
Filed Oct. 4, 1941

Inventor
Wilfred A. Eaton.
By N. D. Parker Jr.
Attorney

Patented Mar. 14, 1944

2,344,399

UNITED STATES PATENT OFFICE 2,344,399

CLUTCH CONTROL MECHANISM

Wilfred A. Eaton, Elyria, Ohio, assignor to Bendix-Westinghouse Automotive Air Brake Company, Elyria, Ohio, a corporation of Delaware Application October 4, 1941, Serial No. 413,678

17 Claims. (Cl. 192—.01)

This invention relates to motor vehicle clutch controlling mechanism and more particularly to a control device for such mechanism wherein operation of the vehicle engine accelerator is coordinated in a novel manner with a device responsive to variations in engine speed.

It has heretofore been proposed to employ a power operated motor for controlling the engagement and disengagement of the clutch of a motor vehicle and, in one known type of installation, such motor has been governed by a device responsive to engine speed. In certain types of clutches having a high mechanical friction, it has also been proposed to control the disengaging operation of the motor through movement of the engine accelerator to idling position and to so arrange the system that the engine speed-responsive device graduates the engagement of the clutch only from a position of light initial engagement to complete engagement. Under such circumstances, the initial movement of the accelerator served to bring the clutch into such light initial engagement prior to an increase in engine speed above idling.

With such prior installations, the clutch is automatically disengaged whenever the accelerator is permitted to return to normal retracted position, and the vehicle accordingly free-wheels. In certain cases, it may be desirable to avoid this free-wheeling condition each time the accelerator is retracted.

It is accordingly an object of the present invention to provide a clutch controlling mechanism of the foregoing character which shall be so constituted as to avoid free-wheeling of the vehicle each time the accelerator is retracted.

A further object is to provide a novel clutch controlling device which shall be entirely automatic in operation and which requires no especial skill on the part of the operator in its control.

Another object is to provide, in an automatic clutch operating mechanism, an arrangement wherein clutch disengagement occurs automatically when the accelerator is retracted and the engine speed is relatively low, and wherein engagement of the clutch is smoothly graduated in accordance with increased engine speed.

Still another object comprehends the provision of a novel clutch controlling mechanism which may be readily adapted to clutches having various mechanical friction loads in the operating connections thereof.

A still further object is to provide, in a system of the above type, other controls whereby the clutch may be automatically disengaged during changes in gear ratio and wherein complete engagement of the clutch may be assured regardless of engine speed.

Other objects and novel features of the invention will appear more fully hereinafter from the following detailed description when taken in connection with the following drawings illustrative of two forms of the invention. It is to be expressly understood, however, that the drawings are employed for purposes of illustration only and are not designed as a definition of the limits of the invention, reference being had for this purpose to the appended claims.

Figure 2:
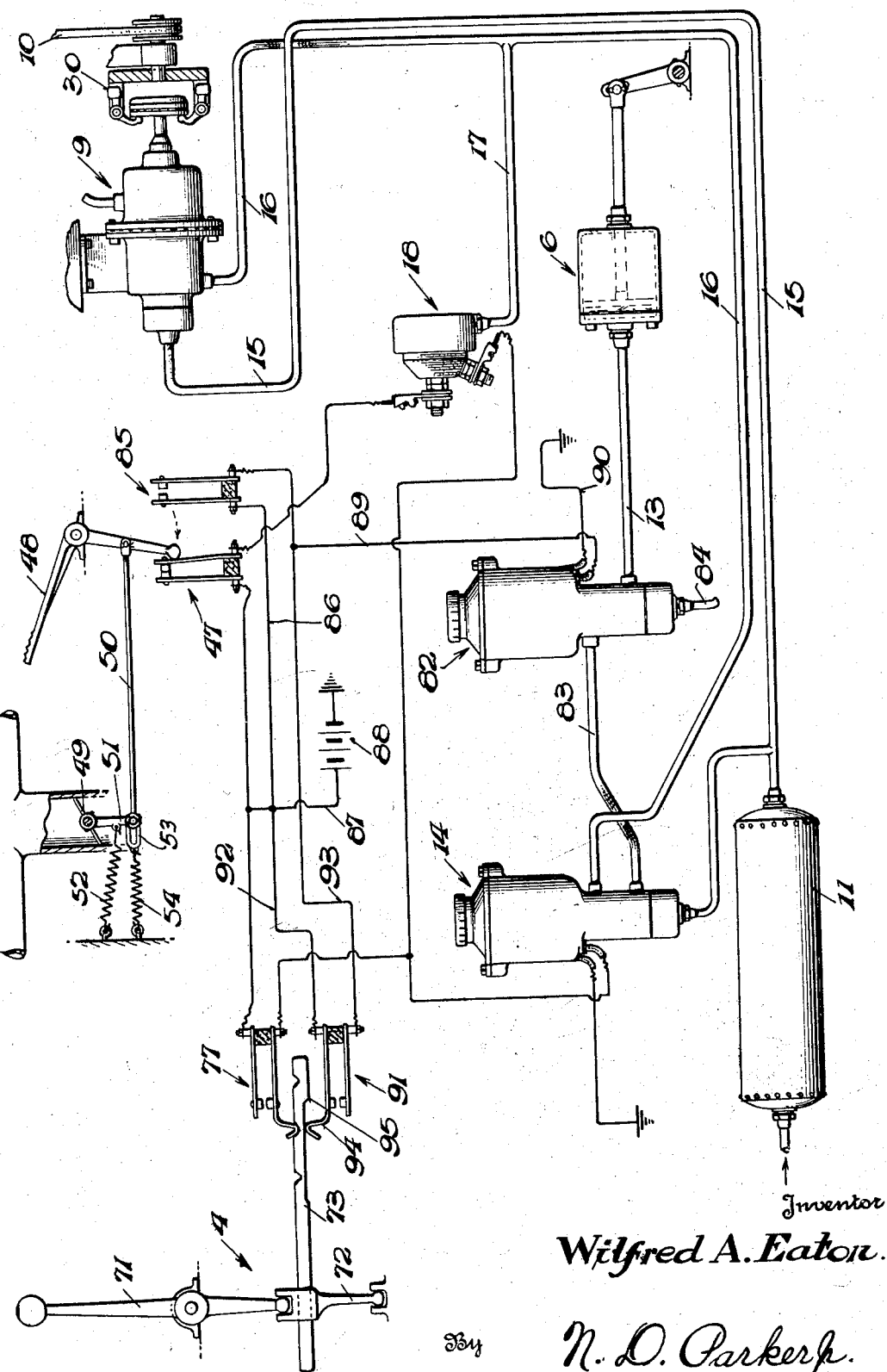

In the drawings, wherein similar reference characters refer to like parts throughout the several views:

Fig. 1 is a diagrammatic view, partly in section, of a clutch control mechanism constructed in accordance with the principles of the present invention, and Fig. 2 is a diagrammatic view, partly in section, of a modified form of the invention.

Referring more particularly to Fig. 1, there is disclosed therein a motor vehicle clutch controlling mechanism constructed in accordance with the principles of the present invention, the same embodying a clutch controlling member 3, a gear shifting mechanism diagrammatically shown at 4, a throttle controlling device 5, and an arrangement for coordinately controlling the clutch upon operation of the gear shifting mechanism and the throttle controlling device, as will be more particularly described hereinafter.

Power means are provided for controlling the clutch engaging and disengaging movements of the member 3, and, as shown, such means include a fluid pressure operated motor 6 having a cylinder 7 housing a piston 8, the latter being suitably connected to the member 3 for effecting disengagement of the vehicle clutch when the piston is moved to the right, as viewed in Fig. 1, and for controlling the engagement of the clutch when the piston moves to the left, as viewed in this figure. It will be understood that the member 3 is connected to the vehicle clutch in any suitable manner by connections not shown. The control of the energization of the fluid motor 6 is effected through movement of the throttle device 5 and the operation of a centrifugally controlled valve mechanism 9, the latter being operated in accordance with the speed of the vehicle engine through a suitable driving connection 10. As contemplated by the present invention, the operation of the above parts in the control of the fluid motor 6 is such that the vehicle clutch will be disengaged whenever the throttle device 5 is permitted to be moved to normal engine idling position and the valve mechanism 9 delivers the maximum pressure for which the same is set. However, in the event that the engine speed is above that corresponding to idling, and valve mechanism 9 does not deliver such maximum pressure, the construction is such that the vehicle clutch will not be disengaged even though the throttle device 5 is moved to normal engine idling retracted position.

In order to control the energization of the fluid motor 6 in accordance with the foregoing, a reservoir 11 of compressed air is adapted to be connected with the motor by way of conduits 12 and 13, an electromagnetically operated valve 14 being interposed in said conduits and being controlled in accordance with the movement of the throttle device 5 and the operation of valve mechanism 9. The reservoir 11 is also connected to supply fluid pressure to the valve mechanism 9 through conduit 15, and the valve mechanism operates to control the pressure in conduit 16 in accordance with the speed of the engine. This last named conduit is directly connected with the valve 14 and is also adapted to supply fluid pressure through a branch conduit 17 to a pressure responsive switch 18, the latter cooperating with the throttle device 5 in the control of the valve 14 as indicated above.

The centrifugally controlled valve mechanism 9 is preferably constructed in a manner similar to that disclosed in the patent to Roy S. Sanford No. 2,228,612, dated January 14, 1941. More particularly, such valve mechanism includes a housing 19 having inlet, outlet and exhaust chambers 20, 21 and 22 respectively. A valve 23 having interconnected intake and exhaust portions 24 and 25, respectively positioned in chambers 20 and 21, is provided for controlling the flow of fluid pressure to and from the valve mechanism 9. Intake portion 24, when open, establishes communication between chambers 20 and 21. Valve 25, when open, serves to connect chambers 21 and 22 by way of port 26 and openings 27 formed in a valve operating member 28. The latter is secured to a diaphragm 29 and is capable of longitudinal movement through action of a suitable centrifugally operable device 30 drivably connected through the connection 10 with any movable part of the engine which is proportional to the speed thereof. Upon increase of engine speed, the device 30 tends to move member 28 to the right against the tension of a spring 31. Thus, upon increase of engine speed, the valve operating member 28 will move away from the exhaust valve portion 25 to connect the outlet chamber 21 with the exhaust chamber 22, the latter communicating with the atmosphere through a conduit 32. At engine idling speed, however, the tension of spring 31 is so adjusted as to cause member 28 to contact exhaust valve portion 25, thus tending to open the intake valve portion 24 and connecting chambers 20 and 21. It is desired to particularly point out that the valve mechanism 9 is of the self-lapping type in that the diaphragm 29 is subjected to the fluid pressure within the outlet chamber 21 through a choke 33. The construction is, moreover, such that the tension of spring 31 may be adjusted by a threaded member 34 so that the valve mechanism is capable of graduating the exhaust of fluid pressure from a predetermined maximum down to zero in accordance with increase in engine speed.

As has heretofore been stated, certain clutches encountered in present day practice have a relatively high mechanical friction loss which must be overcome before the usual clutch return springs are compressed to secure disengagement of the clutch. With the clutch disengaged, the force necessary to overcome such high friction loss must be relieved before the clutch starts to reengage. According to the present invention, the valve device 9 is so adjusted that it serves only to regulate that part of the deenergization of the clutch motor which is necessary after the latter has been deenergized to an extent substantially proportional to the force required to overcome the mechanical friction loss of the clutch.

In order to accomplish the above result, the valve mechanism 9 is so adjusted that, when the engine is idling, the valve mechanism will maintain, within chamber 21, a fluid pressure corresponding to that required in the clutch motor to hold the relatively movable members of the clutch in very light engagement. This is accomplished by adjusting member 34 and hence the tension of spring 31. Under these conditions, the valve mechanism 9 operates as a pressure reducing valve and exhausts all fluid pressure in excess of the amount just indicated. From the foregoing, it will be understood that, with the engine idling and the valve mechanism 9 adjusted as described, fluid pressure will be conducted from reservoir 11 to the valve 9 through conduit 15 and from the latter to the conduit 16 and the pressure in the latter conduit will be sufficient to maintain the clutch motor energized to hold the clutch in very slight engagement.

The control of the energization of the clutch motor by way of conduits 16 and 12 is influenced by the operation of the electromagnetic valve 14. The latter, as shown, includes a casing 35 containing a solenoid winding 36 which, when energized, is adapted to attract an armature 37 against the tension of a spring 38. The armature is secured to a valve actuating member 39 which, in the position shown, connects conduit 16 with an outlet chamber 40 through a bore 41 in the member 39. Conduit 12 leading to the reservoir 11 communicates with an inlet chamber 42 and the connection between the latter and the outlet chamber 40 is controlled by an intake valve 43 connected to an exhaust valve 44 by a stem 45. Normally, the valve 43, 44 is maintained in the position shown as by means of a spring 46 whereupon fluid pressure from conduit 16 is conducted directly to the clutch motor 6 through conduit 13. However, when the winding 36 is energized and the valve operating member 39 is moved downwardly, as viewed in Fig. 1, the lower portion of the member 39 contacts the exhaust valve 44, interrupting communication between conduits 16 and 13. Continued downward movement of the member 39 opens the intake valve 43, thus connecting chambers 42 and 40 and conducting fluid pressure from the reservoir 11 to the clutch motor 6. Thus, when the winding 36 is energized, the clutch motor 6 is supplied with full reservoir pressure and the latter will operate to completely disengage the clutch. On the other hand, when the winding 36 is deenergized, the clutch motor 6 is connected to the valve mechanism 9 through conduits 13 and 16. Since the valve 9, however, is adjusted to exhaust all fluid pressure in excess of that required to keep the clutch in very light engagement, it will be appreciated that such excess of pressure will be promptly exhausted. Hence, as the engine is speeded up, and the centrifugal device 30 functions as heretofore described, the valve device 9 will serve to graduate the exhaust of the pressure remaining in the fluid motor 6 in order to smoothly and gradually permit reengagement of the clutch under the action of its usual return springs.

In order to control the energization of the electromagnetic valve 14, there is provided an electrical circuit including the pressure responsive switch 18 and a switch 47 controlled by the throttle device 5. The latter includes an accelerator pedal 48 connected to a throttle valve 49 by a suitable linkage including a link 50 and a lever 51, the latter being normally urged to the position shown as by a spring 52 in order to close the throttle valve 49 to engine idling position when the accelerator pedal 48 is retracted. In this position of the parts, the lever 51 occupies the right hand end of a lost motion connection 53 between the lever and link 50, such connection being provided for enabling some slight movement of the accelerator pedal 48 away from retracted position prior to actual opening of the throttle valve. A spring 54 normally serves to maintain the link 50 and accelerator pedal 48 in the positions shown. Switch 47 includes a stationary contact 55 and a movable contact 56, closure of these completing a circuit through the solenoid winding 36 by way of conductors 57 and 58, battery 59, conductor 60, switch 18 and conductor 61. The fluid pressure switch 18 may be constructed in any suitable manner but preferably comprises a casing 62 having an insulating cap 63 threadedly secured thereto and between which parts a diaphragm 64 is positioned. This diaphragm completely covers a cavity 65 in the casing to which fluid pressure from conduit 16 is conducted and the diaphragm is normally maintained in the position shown as by means of a spring 66. Seated on the diaphragm is a contact member 67 which is electrically connected to a terminal 68 by the spring 66. Located in the top of the cap 63 is a second terminal 69 which is electrically connected with a contact member 70. Normally, the contact members 67 and 70 are separated by the spring 66, the latter being adjusted, however, as to permit engagement of these contacts whenever the pressure in conduit 16 corresponds to the maximum pressure admitted by the valve mechanism 9. Under these conditions, it will be readily understood that, with contacts 67 and 70 in engagement, under the influence of the maximum pressure admitted by valvular mechanism 9, the circuit through the electromagnetic valve 14 will be completed whenever the accelerator pedal 48 is moved to retracted position and closes the switch 47. As heretofore pointed out, when valve 14 is energized, reservoir pressure will be admitted to the clutch motor to cause complete disengagement of the vehicle clutch. It should be borne in mind, however, that valve 9 will not admit the aforesaid maximum pressure to conduit 16 except in the event that the engine speed drops to substantially the normal idling value since, above this value, the operation of the centrifugal mechanism 39 will serve to connect the chamber 21 with the exhaust chamber 22.

In addition to the foregoing, the present invention provides an arrangement for insuring disengagement of the vehicle clutch during changes in gear of the vehicle transmission. As shown, the gear shifting mechanism 4 is provided with a suitable control lever 71 adapted to selectively engage one of a plurality of gear shifting members 72. Although only one of such members has been illustrated, it will be understood that the gear shifting mechanism is of the well known selective type and includes lever 71 which is pivotally mounted in such a manner that it may select any one of a plurality of devices 72 for effecting any desired gear shift selections and may be thereafter moved in a different plane to establish the desired gear ratio. As shown, the member 72 is provided with a rod 73 which is adapted to be moved as the particular gear relation is established and this rod is provided with a plurality of notches 74, 75 and 76. A switch 77 having a movable contact 78 is adapted to be actuated by movement of the rod 73 and, in the neutral position shown, the movable contact 78 is received in the notch 74 and thus out of contact with a stationary terminal 79. However, upon movement of the rod 73 in either direction from neutral, to establish a desired gear relation, the movable contact 78 is cammed upwardly into engagement with the terminal 79 to complete the switch 77 and this operation serves to energize the winding 36 by way of battery 59, conductors 58 and 57 and connections 80 and 81. Energization of the winding 36 causes operation of the valve 14 in order to supply reservoir pressure directly from the reservoir 11 to the clutch motor 6 in the manner heretofore described. Thus, during changes in gear, disengagement of the clutch is assured regardless of the position of the accelerator pedal 48. As soon as the desired gear relation is established, the movable contact 78 will register with the notches 75 or 76 and the switch 77 will be thus opened in order to deenergize the winding 36 and permit the valve 14 to assume the position shown in the drawings. Reengagement of the clutch may then be effected by increasing the engine speed and the exhaust of fluid from the clutch motor 6 from the value just sufficient to hold the clutch in light engagement to zero will take place in accordance with the operation of valve 9 as described above.

In operation, assuming that there is a supply of air under pressure in the reservoir 11 and that the engine is idling, the valve device 9 will supply fluid pressure to conduit 16 at a value for which the valve 9 is adjusted and, as has heretofore been pointed out, this value is sufficient to hold the clutch in light engagement. This value of pressure, moreover, actuates the switch 18, and, since accelerator pedal 48 is in normal retracted engine idling position, switch 47 will be closed. The winding 36 of valve 14 will hence be energized and the valve 43, 44 moved to such a position as to charge the clutch motor 6 with fluid pressure at reservoir pressure through conduits 12 and 13. With the clutch disengaged and the transmission placed in first gear, for example, the accelerator pedal 48 is depressed to move the vehicle. During the time that the lost motion connection 53 is being taken up and prior to actual opening movement of the throttle 49, switch 47 will be opened, the winding 36 deenergized and the valve 14 returned to the position shown. Since the fluid motor 6 will thereupon be connected to the chamber 21 of the valve device 9, the pressure in the clutch motor will be promptly reduced down to a point where the clutch is in light engagement. This is due to the adjustment of the valve 9 as heretofore described. As soon as the lost motion 53 is taken up and throttle valve 49 is opened, the engine speed increases and the operation of the centrifugal mechanism 39 will control the valve device 9 in order to graduate the exhaust of the fluid pressure remaining in the clutch motor. This action will achieve a fine and graduated engagement of the vehicle clutch.

During subsequent changes of gear, it will be understood that the rods 73 associated with the gear changing mechanism will operate the associated switches 77 in order to energize the winding 36 in the manner heretofore described. Thus, the clutch would be positively disengaged automatically in response to ratio changing movements of the transmission. It will also be perceived that, after completion of the selected gear ratio and deenergization of the winding 36, engagement of the clutch will take place in the manner heretofore set forth.

During normal driving of the vehicle in high gear, it will be readily perceived that, while the accelerator pedal 48 may be returned to retracted position, thus closing switch 47, still the vehicle clutch will not be disengaged until the engine speed drops to such a value that the valve device 9 supplies the maximum fluid pressure to conduit 16 for which it is set. Such maximum pressure will close the pressure responsive switch 18 and only when accelerator controlled switch 47 is closed and switch 18 is closed will the clutch be disengaged.

A modified form of the invention is shown in Fig. 2 and is similar in many respects to the form shown in Fig. 1 except that it includes some added features. One of these is a high gear lock-out for the clutch which prevents the application of fluid pressure to the clutch motor when the transmission is engaged in high gear regardless of the fact that the accelerator pedal 48 may be in engine idling position and the engine speed so low that the valve device 9 supplies substantially the maximum pressure for which it is set. The other feature includes an arrangement for exhausting the clutch motor, regardless of engine speed, when the accelerator pedal is moved to a position approximating that of wide open throttle.

In order to secure the foregoing, the outlet chamber of the electromagnetic valve 14 is connected to the clutch motor 6 by way of a second electromagnetic valve 82, the valves 82 and 14 being of similar construction. The valve 82 when deenergized serves to connect conduit 13 leading from the clutch motor 6 with the outlet chamber of the valve 14 by means of a conduit 83. During normal operation, therefore, the valve 14 controls the flow of fluid pressure to the clutch motor in the same manner as in Fig. 1. However, if the valve 82 is energized, communication between conduits 13 and 83 is interrupted and the clutch motor 6 and conduit 13 are directly connected with an exhaust conduit 84.

The energization of the valve 82 is controlled by a switch 85 which is closed only when the accelerator pedal 48 is advanced to approximately wide open throttle position. Closure of the switch 85 completes a circuit to the winding of the valve 82 by way of conductors 86 and 87, battery 88 and conductors 89 and 90, the latter conductor and one terminal of the battery 88 being grounded and serving as a return. When switch 85 is thus closed, any fluid pressure in the clutch motor 6 will be exhausted to atmosphere through conduit 84 and the clutch permitted to reengage through the action of its usual return springs. This operation is found desirable, for example, in the event that the vehicle is under severe load as when the front wheels might be up against a curb. Under such conditions, the speed of the vehicle engine might not be sufficient to operate valve device 9 to complete the exhaust to the clutch motor and engagement of the clutch would be necessary in order to move the vehicle against the excessive load.

When the vehicle is traveling in high gear in the system of Fig. 1, it is possible that the switch 47 may be closed due to retraction of the accelerator pedal 48 and also the switch 18 may be closed due to the admission of proper pressure to conduit 16 by valve device 9 at low engine speeds. Resultant partial disengagement of the clutch under these conditions might be undesirable. In the arrangement of Fig. 2, there is included a construction avoiding any possibility of partial disengagement of the clutch when the vehicle is traveling in high gear. As shown, the rod 73, controlling the establishment of the second and third gear ratios, is not only provided with the notches controlling the switch 77 but is also provided with means for operating a switch 91, which latter is connected by conductors 92 and 93 in parallel with the switch 85. For example, when third gear is established, the rod 73 is moved to the left from the position shown and the movable contact 94 of the switch 91 engages a cam 95 on rod 73 to close the switch and connect the conductors 92 and 93. When this action occurs, the winding of the electromagnetic valve 82 will be energized by way of conductors 92 and 87, battery 88 and conductors 93, 89 and 90, the common ground on the latter and battery 88 completing the circuit. Thus, whenever the transmission is adjusted to high gear position, the electromagnetic valve 82 will be energized and the fluid motor 6 connected to exhaust. Thereafter, any possibility of clutch disengagement through operation of the switches 47 and 18 will be avoided.

There has thus been provided by the present invention a novel clutch controlling mechanism for a motor vehicle wherein clutch disengagement may be jointly controlled by position of the accelerator pedal and engine speed. The arrangement is such, however, that these two factors are interrelated and disengagement of the clutch may be effected only when the engine speed has dropped to a relatively low value. This arrangement avoids the possibility of free-wheeling of the vehicle which may be found undesirable in certain instances.

While two embodiments of the invention have been described herein with considerable particularity, it is to be understood that the invention is not limited to the forms shown but is capable of a variety of expressions, as will be now readily apparent to those skilled in the art. Reference will, therefore, be had to the appended claims for a definition of the limits of the invention.

What is claimed is:

1. In an automotive vehicle provided with an internal combustion engine, an accelerator and a clutch, power means for operating the clutch to cause engagement and disengagement thereof, means for controlling said power means including accelerator-controlled mechanism for causing clutch-disengaging operation of the power means and for initiating clutch-engaging operation of the power means, said controlling means including means responsive to engine speed for controlling the remaining clutch-engaging operation of the power means after the initiation of clutch engagement, and means responsive to operation of the last-named means above a predetermined engine speed for preventing operation of said accelerator-controlled mechanism in response to operation of said accelerator.

2. In an automotive vehicle provided with an internal combustion engine, an accelerator and a clutch, power means for operating the clutch to cause engagement and disengagement thereof, means for controlling said power means including accelerator-operated mechanism for causing clutch-disengaging operation of the power means and for initiating clutch-engaging operation of the power means, said controlling means including a pre-set valve device for controlling the operation of the power means to secure a rapid engaging movement of the clutch substantially up to the point of initial engagement, means for thereafter operating said valve device in accordance with the speed of the engine for securing a controlled engagement of the clutch, and means for preventing operation of said accelerator-operated mechanism in response to operation of said accelerator when the speed of the engine is above a predetermined value.

3. In an automotive vehicle having an internal combustion engine, an accelerator and a clutch, power means for controlling the clutch-engaging and clutch-disengaging movements of the clutch, means for controlling the operation of the power means including a fluid pressure system having an accelerator-controlled valve and a valve operable in accordance with the speed of the engine, said last named valve being operable in said system to regulate the clutch-engaging movement of said power means as the speed of the engine is increased, and means for preventing operation of said accelerator-controlled valve in response to operation of said accelerator when the speed of the engine is above a predetermined value.

4. In an automotive vehicle having an internal combustion engine, an accelerator and a clutch, a fluid pressure motor for controlling the clutch-engaging and clutch disengaging movements of the clutch, a source of fluid pressure, means for controlling the operation of said motor including an accelerator-operated valve operable to connect said motor and source when the accelerator is moved to release position, a second valve operatively connected with said first valve, said second valve being preadjusted to automatically reduce the pressure in said motor to a predetermined value and being connected with the motor through the first valve when the accelerator is moved away from release position, means for operating said second valve in accordance with variations in engine speed to regulate the further reduction of the pressure in said motor whereby the clutch will be gradually engaged, and means for preventing operation of said accelerator-operated valve in response to operation of said accelerator to connect the motor and source until the engine speed drops to a predetermined value.

5. In an automotive vehicle provided with an internal combustion engine, an accelerator and a clutch, power means for operating the clutch to cause engagement and disengagement thereof, means for controlling said power means including a pair of valve devices, means for controlling one of said devices in accordance with the speed of the engine, and means for controlling the other device in accordance with the speed of the engine and movements of the accelerator.

6. In an automotive vehicle having an internal combustion engine, an accelerator and a clutch, power means for controlling the clutch-engaging and clutch-disengaging movements of the clutch, means for controlling the clutch-engaging operation of the power means comprising a valve preadjusted to decrease the energization of the power means a predetermined amount upon movement of the accelerator in a direction to increase engine speed, means controlled by engine speed for controlling the further operation of the valve to complete the deenergization of said power means, and means controlled by engine speed and movement of the accelerator to retracted position for energizing the power means.

7. In combination with an automotive vehicle having an engine, a clutch, and a carburetor provided with a throttle-operating member, of a power device connected to the clutch, control means for energizing and deenergizing said power device, said control means including a valve operatively associated with the throttle-operating member, and a second valve controlled by engine speed, and means controlled by said second valve and throttle-operating member for preventing operation of the first-named valve during all speeds of the engine above a predetermined value.

8. In combination with an automotive vehicle having an engine, a clutch and a carburetor provided with a throttle-operating member, of a power device connected to the clutch, a governor adapted to be drivably connected with the engine, a pair of valves for controlling the operation of said power device, one of said valves being operatively associated with said throttle-operating member and the other of said valves being operatively connected with said governor, and means controlled by said other valve and throttle-operating member for preventing operation of said one valve during all speeds of the engine above a predetermined value.

9. In an automotive vehicle provided with an internal combustion engine, an accelerator and a clutch, fluid pressure means for operating the clutch to cause engagement and disengagement thereof, means for controlling said fluid pressure means including accelerator-controlled mechanism for controlling the energization of the fluid pressure means for causing clutch-disengaging operation of the latter and for initiating clutch-engaging operation thereof, said controlling means including means responsive to engine speed for controlling the remaining clutch-engaging operation of the fluid pressure means after the initiation of clutch engagement, and means controlled by said speed-responsive means for preventing operation of said accelerator-controlled mechanism in response to operation of said accelerator at speeds above a predetermined speed.

10. In an automotive vehicle having an internal combustion engine, an accelerator and a clutch, power means for controlling the clutch-engaging and clutch-disengaging movements of the clutch, means for controlling the operation of the power means including a fluid pressure system having an accelerator-controlled valve and having also a valve operable in accordance with the speed of the engine, said last named valve being operable in said system to regulate the clutch-engaging movement of said power means as the speed of the engine is increased, and means for preventing operation of the first-named valve in response to operation of said accelerator when the speed of the engine is increased above a predetermined value.

11. In an automotive vehicle provided with an internal combustion engine, an accelerator and a clutch, power means for operating the clutch to cause engagement and disengagement thereof, means for controlling said power means including a pair of valve devices, means for controlling one of said devices in accordance with movements of the accelerator, means for operating the other device in accordance with the speed of the engine, and means for preventing operation of said one device in response to operation of said accelerator during all speeds of the engine above a predetermined value.

12. In an automotive vehicle provided with an internal combustion engine, an accelerator and a clutch, power means for operating the clutch to cause engagement and disengagement thereof, means for controlling said power means including a pair of valve devices, means for controlling one of said devices in accordance with the speed of the engine, and means for controlling the other device in accordance with movements of the accelerator and the degree of energization of the power means.

13. In an automotive vehicle provided with an internal combustion engine, an accelerator, a gear changing mechanism, and a clutch, power means for operating the clutch to cause engagement and disengagement thereof, means for energizing said power means including a pair of valve devices, means for controlling one of said devices in accordance with the speed of the engine, means for controlling the other device in accordance with movements of the accelerator and the degree of energization of the power means, and means for controlling the other device in accordance with the movements of the gear changing mechanism independently of the movement of the accelerator and the degree of energization of the power means.

14. In an automotive vehicle provided with an internal combustion engine, an accelerator and a clutch, power means for operating the clutch to cause engagement and disengagement thereof, means for controlling said power means including a pair of valve devices, means for controlling one of said devices in accordance with the speed of the engine, electromagnetic means for controlling the other device, a pair of switches arranged in series with said electromagnetic means, means for controlling one of said switches in accordance with movements of the accelerator, and means for controlling the other switch in accordance with the degree of energization of said power device.

15. In an automotive vehicle provided with an internal combustion engine, an accelerator, a gear changing mechanism and a clutch, power means for operating the clutch to cause engagement and disengagement thereof, means for controlling said power means including a pair of valve devices, means for controlling one of said devices in accordance with the speed of the engine, electromagnetic means for controlling the other device, a pair of switches arranged in series with said electromagnetic means, means for controlling one of said switches in accordance with movements of the accelerator, means for controlling the other switch in accordance with the degree of energization of said power device, and means for controlling said other device in accordance with the movements of the gear changing mechanism.

16. In a motor vehicle having an engine, a change speed transmission, a clutch controlling member, and a throttle controlling element, a fluid motor for controlling said member, a source of fluid pressure, a valve for connecting said source and motor to effect clutch-disengaging movement of said member, a second valve responsive to engine speed for graduating exhaust of fluid pressure from said motor, means for controlling the operation of the first-named valve in accordance with movement of said element and said second valve, and means controlled by operation of said transmission in changing speeds for operating the first-named valve.

17. In combination with an automotive vehicle having an engine, a clutch, and a manually operable vehicle controlling member, of a power device connected to the clutch, control means for energizing and deenergizing said power device, said control means including a valve operatively associated with said manually operable vehicle controlling member, and a second valve controlled by engine speed, and means controlled by said second valve and manually operable member for preventing operation of the first named valve during all speeds of the engine above a pre-determined value.

WILFRED A. EATON.